United States Patent
Cheng et al.

(10) Patent No.: US 6,182,151 B1
(45) Date of Patent: Jan. 30, 2001

(54) METHOD AND APPARATUS FOR BATCH STORAGE OF OBJECTS IN A CLIENT-SERVER STORAGE MANAGEMENT SYSTEM

(75) Inventors: Hsiuying Cheng, Fremont; Jung-hsin Hu; Kyung B. Lee, both of San Jose, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 08/688,272

(22) Filed: Jul. 29, 1996

(51) Int. Cl.[7] .............................. G06F 9/00; G06F 9/46; G06F 15/163
(52) U.S. Cl. ............................................ 709/310; 709/101
(58) Field of Search ..................................... 395/680, 609, 395/603, 200.43; 370/62; 709/213, 310–332, 200, 101

(56) References Cited

U.S. PATENT DOCUMENTS

| | | |
|---|---|---|
| 5,115,392 | 5/1992 | Takamoto et al. . |
| 5,327,559 | 7/1994 | Priven et al. . |
| 5,329,619 | 7/1994 | Pagé et al. . |
| 5,351,276 * | 9/1994 | Doll, Jr. et al. ........................ 379/67 |
| 5,452,299 * | 9/1995 | Thessin et al. ......................... 370/62 |
| 5,504,888 | 4/1996 | Iwamoto et al. . |
| 5,511,220 | 4/1996 | Perlman . |
| 5,649,185 * | 7/1997 | Antognini et al. .................... 395/605 |
| 5,734,885 * | 3/1998 | Agrawal et al. ...................... 395/603 |
| 5,878,220 * | 3/1999 | Olkin et al. ...................... 709/200.47 |
| 5,896,506 * | 4/1999 | Ali et al. ............................... 709/213 |

* cited by examiner

*Primary Examiner*—Majid Banankhah
*Assistant Examiner*—P. G. Caldwell
(74) *Attorney, Agent, or Firm*—Sughrue, Mion, Zinn, Macpeak & Seas, PLLC

(57) ABSTRACT

The present invention is directed to a storage management system. More particularly if relates to a client/server library system for storing objects in the library system in batches by avoiding storing those objects in an intermediary storage, such as in a client storage space or in a cache, before storing them in the library system. The invention includes a library server, object server and library client, in which an application program interacts with the library client for storing objects, or binary large objects (blobs), in the object server under control of the library server. The present invention provides for an application program to read in objects into a memory space allocated and managed by the application program, or into an application program memory space allocated and managed by the library client. When the library client stores the objects residing in the allocated memory space, copies of the objects are transferred directly from the allocated memory space to the object server without having another copy of the object first being made in the library client, such as in the library client storage space or in a client cache. Accordingly, batch storage of objects is accomplished more efficiently than in conventional library system.

12 Claims, 3 Drawing Sheets

METHOD AND APPARATUS FOR BATCH STORAGE OF OBJECTS IN A CLIENT-SERVER STORAGE MANAGEMENT SYSTEM

BACKGROUND OF THE INVENTION

1. Field of the Invention

This invention is related to the field of information and storage management and, more particularly, to a client/server system and method for storing a plurality of objects in an object store in a batch storage mode without making an intermediary copy of the object.

2. Description of the Related Art

Client/server object storage systems have been used to store and manage a wide variety of digital objects such as documents, graphics, audio, video, spread sheets and word-processing text. Such digital objects are known generally as binary large objects (blobs).

A conceptual view of a conventional client/server system is shown in FIG. 1 and includes a library server 10, one or more object servers 20 and a library client 30. Each of the library and object servers and the client includes an information store. That is, the library server 10 includes a library catalog 12, the object server 20 includes an object store 22 and the library client 30 includes a client cache 32, as shown in FIG. 2. Also, a communications isolator (not shown) is included which allows the library server, object server and library client to communicate with one another without concern for complex communications protocols. The library server, object servers and clients are connected by a communications network, such as a wide-area network (WAN), but also can be locally connected via a local area network (LAN).

In the conventional client/server library system the library client is implemented on a workstation, such as a personal computer, and the library and object servers are implemented on a host processor.

The library clients 30 each send requests to the library server 10 to store, retrieve, and update objects stored in object servers 20, and to update and query the object indices and descriptive information stored in library catalog 12. Library client requests are generated by library patrons. These patrons are users who have been granted privileges for the use of the library system.

Two types of library servers have been used, a host based library server (HBLS) and a LAN based library server (LBLS). The HBLS, is a program that can be implemented on a mainframe computer in an IBM MVS/ESA environment running under Customer Information & Communication System (CICS). The library catalog with which it interacts can be implemented with an IBM DATABASE 2 (DB2) database.

Before a library client request is processed, library server 10 checks library catalog 12 to ensure that the patron's name and password are valid. Next, the library server ensures that the patron has been granted the appropriate privileges to perform the requested action. Each patron is assigned a set of privileges by a system administrator. An example of a library privilege is the ability to delete objects.

Finally, the library server checks to ensure that the object's owner has granted the patron the privileges needed to do what is requested (e.g., update the object). The owner of an object is the patron who first stored the object. When an owner stores an object that owner must specify which other patrons are to have access to the object.

Objects stored in the library system can be checked out by a patron for a specified period of time. This feature can be used to ensure that one patron's updates to an object are not overwritten by another. While an object is checked out by a patron, other patrons can retrieve the object and view it, but they cannot update it. In typical implementations, there are groups of individuals who need access to the same objects. Therefore, to simplify the process of granting access to objects a system administrator can define patrons as members of a group. When a patron is defined as a member of a group, that patron is able to access any object for which the group has been granted privileges. Additionally, patrons can access objects for which they have been specifically granted individual privileges. A patron can set default groups whose members will have access to the objects the patron stores. When patrons store objects, they have the option to use this default group, to grant specific privileges to groups and individual patrons, or to do both.

If a library client request involves the storage, retrieval, or update of an object, library server 10 forwards the request to the object server 20 that contains or will store the object(s) referred to in the request based upon information provided by library catalog 12. If the library client request is a query of the information stored in library catalog 12, library server 10 will interact only with library catalog 12 and will not contact object server 20.

The library catalog is analogous to a conventional library's card catalog. It is a single set of database tables which contain an index of all the objects stored in the library system. In addition, it can store information such as textual descriptions for each object, information on the type of object (e.g., image object, spreadsheet, text document), library patron names and privileges, access authorization data for each object, links between objects. The library catalog can also store a virtually unlimited number of property type/property value pairs for each object (e.g., name/John, Age/35, Address/1 Greenway Drive). These property type/property value pairs are known as an object's properties.

An object server 20 maintains objects stored within the library system. Objects are stored or retrieved from an object store 22 by object server 20. Object server 20 receives requests from library server 10 and communicates with library client 30 to complete the requests. Such a library system can contain several distributed object servers.

In the conventional library client/server system, object server 20 communicates with the library client 30 via the client cache 32. That is, when an object server retrieves an object from library client 30, it retrieves the object from the client cache 32. Similarly, when sending an object to library client 30, object server 20 places a copy of the object in client cache 32.

Two types of object servers have been used, a host based object server (HBOS) and a LAN based object server (LBOS). The HBOS is a program implemented on a mainframe computer, for example in a MVS/ESA environment running under CICS. It interacts with the IBM Object Access Method (OAM) to provide object storage. The LBOS is a program implemented in a workstation, such as in an OS/2 environment, and provides object storage on a LAN.

When a library patrons's privileges are defined a default object server can be set for the patron. When a patron stores an object, it will be stored in the default object server for that patron. If it is later determined that an object or a group of objects should be relocated to a different object server, a client application can move the objects from one object server to another.

An LBOS can be located on any workstation having sufficient hardware resources and is connected to the library server. Furthermore, LBOS can be located at a site remote from the library server and local to the user. This allows selected objects to be stored close to a remote group of library patrons who will frequently use these objects. This capability is called distributed object storage. Distributed object storage helps to reduce the costs associated with sending objects over communications lines and provides better performance in storing and retrieving objects.

The HBOS interacts with IBM OAM to implement an object store that is maintained as a set of IBM DB2 tables. These DB2 tables can be monitored, backed up, and recovered using standard DB2 utilities. OAM is capable of managing its information store using a combination of direct access storage devices (DASD) and write once read many (WORM) optical storage.

LBOS implements its object store by using a combination of the LBOS workstation hard drives and an optional optical library subsystem (often called an optical jukebox). The optical library supported by LBOS is capable of storing optical cartridges internally. Shelf-resident optical cartridge support is also provided, thus greatly expanding the storage capacity of the optical server. LBOS controls the migration of objects between the workstation hard drive, which functions as a staging area, and optical storage. Because a workstation's hard drive can access stored information faster than an optical jukebox, LBOS ensures that newly stored objects and objects that have recently been retrieved are maintained on the workstation hard drive. As the workstation hard drive becomes full, LBOS removes those objects to optical storage that has been least recently accessed to free storage space for new objects. A single drive optical drive can also be attached to LBOS to provide a transaction log as a backup mechanism for the optical library.

LBOS includes a variety of storage administration functions, such as transaction logging and the ability to write out duplicate copies of images and files to support full backup and recovery.

The library client 30 is the interface through which application programs can submit requests to the library system. These can include requests to store objects, update/add descriptors to objects, delete objects and query information in the library catalog. Library requests can be submitted through the library client either individually or in batches.

The client cache 32 is a specialized function, implemented on a user's workstation. The cache is used to locally hold copies of objects that have been stored to or retrieved from the object server. These local copies allow a library client fast access to objects and provide a means for communicating between the library client and the servers. When a library client requests a copy of an object from the library server, the library server causes a copy of that object to be sent from the object server which owns it to the library client that requested that object. The object is stored in the client cachie of the requesting library client. When library request orders are submitted by library client 30 to library server 10 a copy of the request is also stored in client cache 32.

FIG. 2 illustrates the data flow in a conventional digital client/server library system. A client, such as client 30, can be located remotely from the library server 10 and object server 20. Typically, the client 30 is connected to library server 10 and object server 20 via a WAN, although it can also be connected via a LAN. Moreover, object server 20 may be connected to library server 10 via a WAN, although the library server 10 and object server 20 can be located in the same physical machine.

When an object, present in memory allocated by an application program 40, such as blobs $1_a$–$N_a$ shown in FIG. 2, is to be stored in the library system the application program 40 interacts with the library client 30 to request the library server to store the object in the library system. In the conventional client-server library system the application program 40 must first pass the object to the library client 30 via an application programming interface (API). The library client 30 makes a copy 1 of the object to be stored in its memory space and then places another copy 2 in client cache 32 under the assumption that since the object was referenced once by the client it is likely that it will again be referenced again in the near future. Accordingly, a copy of the object is available in the client cache 32 in the event an application program 40 requests the same object. If application program 40 does request that same object, then the conventional client-server library system, under control of the library server 10, makes the copy of the object in the client cache 32 available to the application program rather than retrieving it over the communications network from object server 20.

Once library client 30 has stored a copy of the object in its client cache 32, library client 30 sends a request 3 to library server 10 to store the object, or blob, in an object server in the library system. The library client 30 includes in request 2 a handle to the blob which identifies the location of the blob in client cache 32.

Upon receipt of the request library server 10 consults library catalog 12 and determines which object server has been designated as the default object server for the library client making the storage request. Here, the default object server is shown as object server 20, to which library server 10 issues a request 4 to object server 20 to retrieve the blob from client cache 32. Request 4 includes the handle to the blob.

Upon receiving request 4, object server 20 allocates storage in object server 20. The object server then communicates with library client 30 via a transaction program 34. Through the transaction program 34 the blob (i.e., one of $blob1_c$–$blobN_c$) is retrieved from the client cache 32 based on the handle to the blob. Accordingly, the blob is copied from client cache 32 to object server 20, and is eventually copied to object store 22 (as one of $blob1_d$–$blobN_d$). The double line 5 shown in FIG. 2 indicates a copy of the blob which is transmitted from library client 30 to object server 20.

When the blob is successfully transmitted from client cache 32, object server 20 sends a response 6 to library server 10 upon successful transfer of the blob to object server 20. Upon receiving the storage response 6, library server updates tables in library catalog 12 to reflect storage of the object in object server 20. Library server 10, in turn, sends a response 7 to requesting client 30 indicating to library client 30 that the blob was successfully transferred to client cache 32.

When an application program requests retrieval of an object in the conventional library system an application program causes library client 30 to request library server 10 to have object server 20 send a copy of the object to library client 30 to be stored in its client cache 32, and control information is passed from object server 20 to library server 10 to library client 30 to notify library client 30 that the blob has been stored in client cache 32. However, if the requested blob is already present in client cache 32 due to a previous reference, then library client 10, rather than requesting object server to send another copy of the object to library client 30, will notify library client 30 that the object is available in the client cache and will pass a blob handle indicating to the client the location in the client cache at which the requested object is located.

In order to store a plurality of objects in the object server of the conventional client-server library system, individual requests to store each object are required. Furthermore, by copying the object from a storage area managed by the application program to the library client storage area and to the client cache for transmission to the object server requires redundant allocation of resources, particularly memory resources. Such a redundancy in memory allocation can become burdensome when a large number of objects are stored via a single library client without a significant amount of subsequent reference to recently used objects by that library client. Furthermore, by first storing an object in client cache 32 the time to store an object in an object server is increased. Because all objects are first stored in the library client memory space and in the client cache prior to storing them in the object store of the object server, the time and memory resources required to store a large number of objects can become burdensome.

SUMMARY OF THE INVENTION

It is an object of the present invention to solve the problems of the conventional client/server library system. That is, the present invention reduces the required resources to store images in a client-server library system by storing an object in an object server directly from an application program memory space rather than first copying the object into an intermediary memory space, such as a library client storage space and a client cache, before transmitting a copy of the object to an archival storage unit such as object server 20 and object store 22.

In order to accomplish this object the present invention is directed to a method for storing and managing objects in a distributed information storage management system including an application program having an application storage area for storing an object, a client having a client storage area, an object server for storing an object and a centralized server having information stored therein regarding the client and the location of the object, the method comprising the steps of:

(a) storing the object in the application storage area;

(b) sending a first request from the client to the centralized server to store the object in the object server;

(c) sending, in response to the first request, a second request from the centralized server to the object server to retrieve a copy of the object from the application storage area;

(d) retrieving, in response to the second request, the copy of the object directly from the application storage area;

(e) storing the copy of the object retrieved in step (f) in the object server; and (f) storing in the centralized server information identifying the copy of the object as being stored in the object server.

The invention also is directed to an apparatus for storing and managing objects, comprised of:

a catalog server;

an object server;

a client; and an application program having a storage area for storing an object and communicating with the client, wherein in response to a request from the application program the client sends a storage request signal to the catalog server requesting storage of the object in the object server, whereupon in response to the storage request signal the catalog server sends a command signal to the object server to retrieve the object from the storage area of the application program, and in response to the command signal from the catalog server the object server retrieves the object from the storage area and stores the retrieved object in the object server.

BRIEF DESCRIPTION OF THE DRAWINGS

The above and other objects and advantages of the invention will becomes more apparent and more readily appreciated from the following detailed description of the presently preferred embodiments of the invention taken in conjunction with the accompanying drawings, of which.

DETAILED DESCRIPTION OF THE PREFERRED EMBODIMENTS

Figure 1:
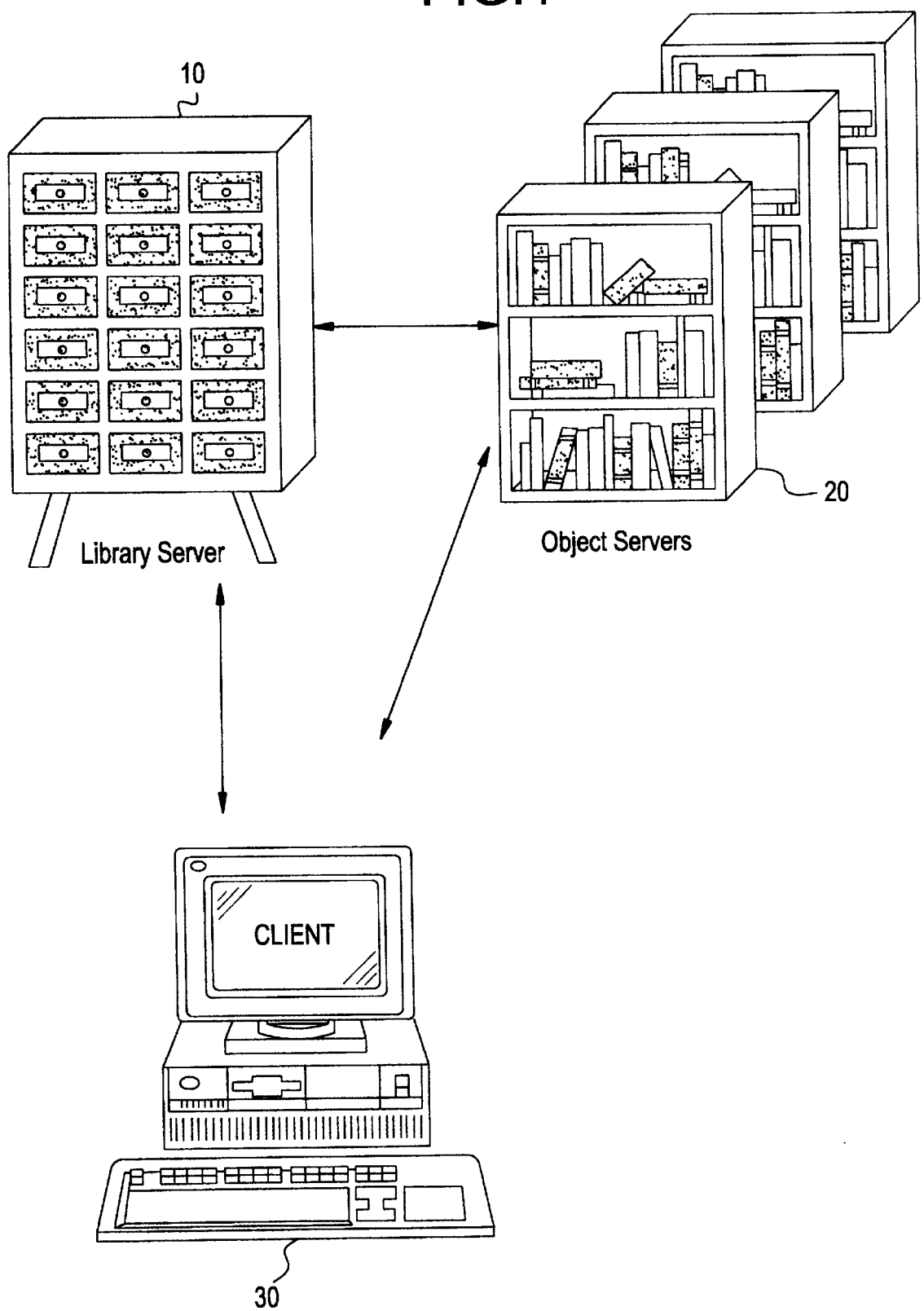
FIG. 1 is a diagram showing a conceptual model of a conventional digital client/server library system.
Figure 2:
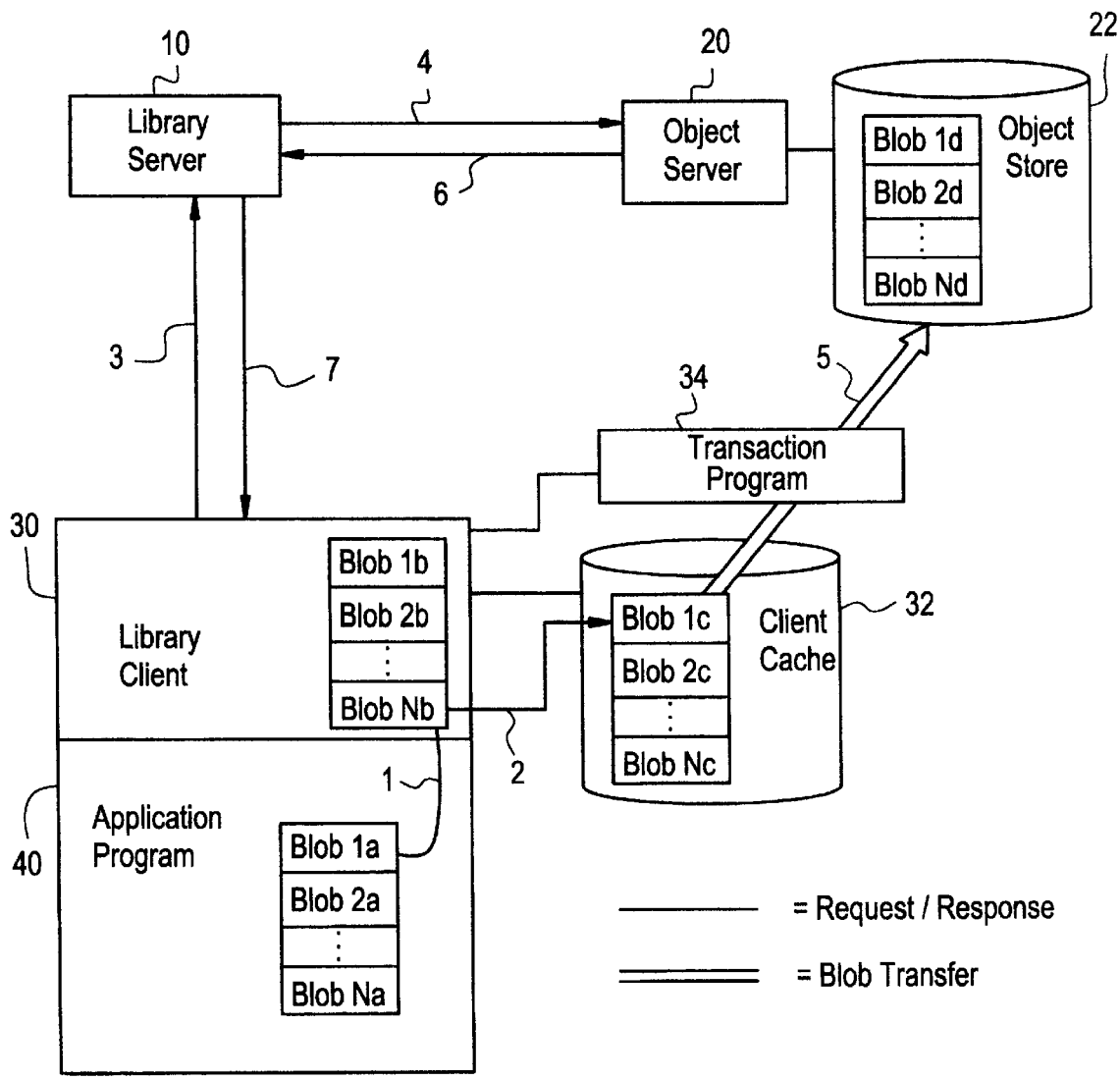
FIG. 2 is a diagram showing data flows in a conventional digital client/server library system.

The embodiments of the present invention are described below in more detail with reference to the above drawings, in which like reference numerals refer to the same or similar elements.

The present invention allows one or more objects to be transmitted directly, via a transaction program, from an application program's memory space to an object server and object store without requiring the blob to first be stored in an intermediary storage area such as in the library client storage space and in the client cache. The present invention, by eliminating the need to store an object first in the library client and the client cache, can store a plurality of objects more efficiently than a conventional client/server library system.

In a preferred embodiment of the present invention, the library client and library server and object server all operate on the same machine, preferably a mainframe computer, although, the present invention is not limited to such an environment. Further, the library client, library server and object server all operate in a transactional environment, such as under CICS. A transaction program, which also runs under CICS, supplies the communications support for communicating between library client and object server.

Figure 3:
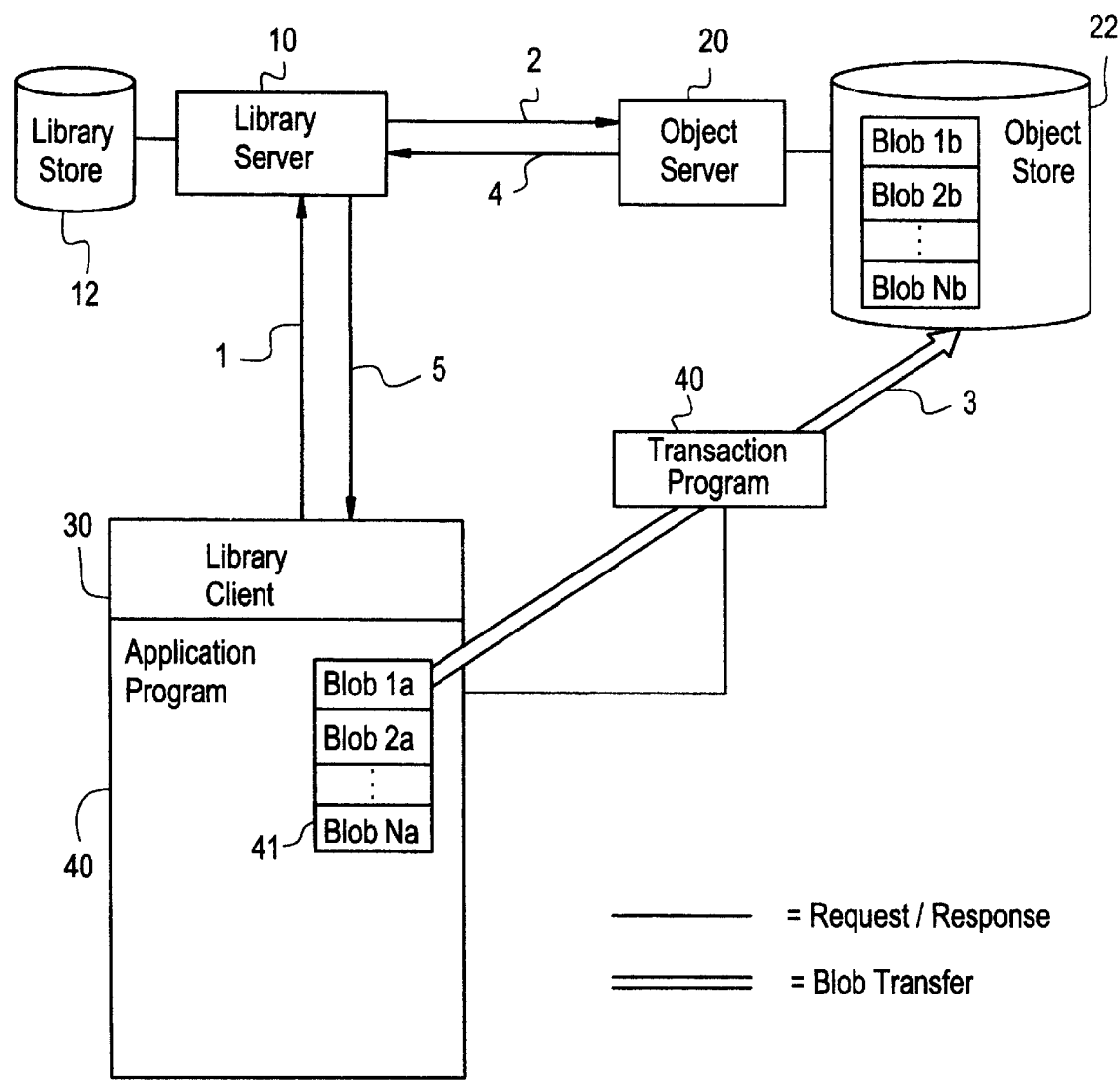
FIG. 3 is a diagram showing data flows in storing an object in a client-server library system from an application program memory space according to the present invention.

FIG. 3 shows a data flow diagram in which an application program 40, also running in the same transactional environment, allocates a storage space 41 which the application program controls. The application program then stores objects or blobs, such as blobs $1_a$–$N_a$ in its allocated storage space 41. As an example, the application running under CICS could execute a CICS GETMAIN NOSUSPEND instruction to allocate the memory 41.

Once memory 41 is allocated application program 40 can read in an object, which could be input via a peripheral device such as a scanner or the like. Application program 41 then stores in its allocated memory space 41 as a blob the object which was read in, along with control information such as the length of the blob, etc. The application can store a plurality of blobs, limited only by the constraints of the environment in which it operates. FIG. 3 shows N blobs stored in the application memory space 41 as blob1$_a$–blobN$_a$. Accordingly, the application can store a plurality of blobs which are to be stored as a batch in the client/server library system.

In order to store the blob in the client/server library system, a request block must be created to send from the library client 30 to library server 10 which contains requests for instructing the library server 10 to store the objects in the library system. Accordingly, application program 40, via library client 30 builds request blocks containing requests for each blob, to be sent to library server 10. Examples of requests to be sent to library server 10 might be to define the object as a particular type of item. For example, in the IBM VISUALINFO product, an object can be defined as a document which is comprised of individual objects, such as scanned images. Another example of an item is a folder which could be comprised of multiple documents. In the VISUALINFO product, the application would issue the LibStoreItemPart API to define the type of item for the object.

Moreover, other requests can be sent to library server 10 such as setting a particular view class for the object, in which case the application program can call the LibSetAttrValues API. Further still, the application can link the object with another item in the library by issuing the LibLinkitems API which creates a parent-child type relation between objects.

For each blob to be stored library client 30 must provide library server 10 with a handle to the blob. The blob handle identifies the storage location of the blob which object server 20 must have to find and retrieve a copy of the blob. In this instance application program 40 issues LibAllocateItemPart to cause library client 30 to return a blob handle. In the conventional client/server library system the LibAllocateItemPart API allocates storage space in the library client and in the client cache, in addition to returning the blob handle. However, the present invention avoids allocating such redundant memory resources, yet still returns a blob handle.

Since application program 40 controls the memory space 41 in which the blobs are stored, it provides the starting address of the blob to library client 30 by issuing the LibSetitemPartStorage API. Here, library client 30 sets the value of the blob handle to the starting address in the application memory 41 for the blob to be stored. Now the blob handle is properly set to identify the blob's location in the application memory space 41, and the blob can be stored in the library system.

The application program creates a request to store the blob by calling the LibStoreItemPart API which, upon receipt by the library server 10, causes the blob to be stored in the library system. The application program issues a LibEndTransaction API which upon receipt by the library server 10 causes the entry in the library store tables relating to the storage of the object, to be committed in the underlying database of library server 10.

Each of the above described steps are performed for storing each blob in the batch. Once the request block is built for storing the batch of objects in the library system, the application program issues LibEndTransaction and LibEndRequest APIs to library client 30, causing library client 30 to send the request block to library server 10. For each blob to be stored the request block includes a store request 1 sent by library client 30 to library server 10. When library server 10 receives this request it sends a request 2 to object server 20 which causes object server 20 to communicate with transaction program 40, including passing the handle of the blob which is to be stored and its size. Transaction program 40, having the handle to the blob and the size of the blob, causes the blob to be sent 3 from the application program memory space 41 to object server 20, where a copy of the blob (e.g., blob1$_b$) is eventually stored, according to object server management programs, in the object store 22. Once the object server 20 successfully receives the blob, it sends a response 4 to library server 10 which updates its tables in library store 12 to indicate that the object has been stored in object server 20. Library server 10 then notifies library client 30 that the object is successfully stored by sending a response 5. Accordingly, library client notifies the application program 40 of the successful storage of the object in the library system.

Upon notification that the object is successfully stored, application program 40 can free the resources used to store the blob stored (i.e., blob1$_a$), thereby conserving resources. The next blob in the batch (e.g., blob2$_a$) can be stored in the library system by following the same procedure until all N blobs in the batch are stored in object server 20. In this manner the blobs are stored once by the application program 40 in application program memory 41, and a copy of that instance of the object is transferred directly from the application program memory space 41 via transaction program 40 to object server 20 without being stored in an intermediary storage area such as in the library client storage space or in the client cache. Accordingly, the memory resources are conserved and the object is stored more efficiently than in the conventional library system.

In an embodiment of the invention which has been implemented and tested, N can equal 50. In other words, in one instance of the present invention a maximum of 50 blobs can be stored by an application program 40 in its program memory space 41 for batch storage in the library system. However, the present invention is not limited to only storing 50 blobs at a time, but rather is limited only by the environment in which it is implemented. Accordingly, the present invention is directed to storing an unlimited number of objects in the manner described.

Furthermore, the present invention can employ a plurality of application programs each of which operates to simultaneously batch store a plurality of blobs in the manner described above. That is, more than one batch storage application can be run simultaneously, thereby simultaneously storing a plurality of objects in the library system, exceeding the number of objects that can be stored by a single application program.

In another embodiment of the invention the application program memory space 41 can be allocated by using services provided by the library client 30 rather than relying on the application program to allocate storage. The conventional digital client/server library system, as described above, employs a file based client cache 32 which provides a persistent information store. This embodiment of the present invention, however, avoids the need for a file based cache in library client 30 by employing a memory storage arrangement, such as a memory buffer which is not a persistent store, as opposed to requiring the application program to allocate and manage memory for reading in objects.

By using a memory storage arrangement instead of a file based client cache the number and amount of resources required at the client is reduced. However, in a library client using only a memory arrangement the number of objects that can be practically stored at the client is much less than for a client having a file based client cache. Accordingly, the number of blobs that can be stored in a client having only a memory arrangement can be much more limited than for a client having a file based client cache. In this embodiment, when an object is read in by an application program the application program relies on the library client 30 to allocate and manage memory for reading in objects. Accordingly, library client 30 provides a memory buffer rather than a disk-based client cache 32. In the IBM VISUALINFO product the library client provides this capability via the LibAllocateItemPart API, in which an application program indicates that a memory buffer should be allocated.

The memory buffer contains a header identifying a set of elements which describe the entries in the memory buffer. These elements in the header have a structure that is similar to that used in the client cache. Accordingly, when library server 10 sends a request to object server 20 indicating that the blob is to be retrieved from the library client 30, that request contains a handle to the blob which is stored in the memory buffer so that the object server 20 can search the header for the identifier of the blob and then access it via the memory buffer.

By eliminating the client cache 32 the required resources for the client are reduced over that required in the conventional client/server library system.

In the present embodiment library client 30 can allocate in-memory storage separate from storage in the client cache 32, as discussed above by using the LibAllocateItemPart API with a parameter indicating that the memory buffer should be allocated rather than using storage space in the client cache 32. Upon the application program 40 issuing this API, library client 30 allocates a memory buffer. The application program 40 can receive a handle to this allocated storage by issuing the LibXtractItemPartStorage API, which will provide an address to the allocated storage. The application program 40 can then use this allocated storage in order to read objects into that storage space so that those objects can be stored in the client/server library system as described above.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for storing and managing objects in a distributed information storage management system including an application program having an application storage area for storing an object, a client having a client storage area, an object server for storing an object and a centralized server having information stored therein regarding the client and the location of the object, the method comprising the steps of:

(a) storing the object in the application storage area;

(b) sending a first request from the client to the centralized server to store the object in the object server;

(c) sending, in response to said first request, a second request from the centralized server to the object server to retrieve a copy of the object from the application storage area;

(d) retrieving, in response to said second request, said copy of the object directly from the application storage area;

(e) storing said copy of the object retrieved in step (d) in the object server; and (f) storing in the centralized server information identifying said copy of the object as being stored in the object server.

2. The method recited in claim 1, wherein said steps (a) through (f) are repeated for a plurality of objects.

3. A method for storing and managing objects in a distributed information storage management system including an application program having an application program storage area for storing a plurality of objects, a client having a client storage area, an object server for storing the plurality of objects and a centralized server having information regarding the client stored therein and the location of the object, the method comprising the steps of:

(a) storing the plurality of objects in the application program storage area;

(b) sending, for each of the plurality of objects stored in step (a), a first request from the client to the centralized server to store the plurality of objects in the object server;

(c) sending, in response to each of said first requests sent in step (b), a second request from the centralized server to the object server to retrieve a copy of the corresponding object from the application program storage area;

(d) retrieving, in response to each of said second requests, the corresponding copy of the object directly from the application program storage area;

(e) storing said copy of the object retrieved in step (d) in the object server; and (f) storing in the centralized server information identifying each of said copies of the object as being stored in the object server.

4. A computer program product for use in a computer system, said computer program product comprising a computer-readable medium of instructions for storing and managing objects in a distributed information storage management system including an application program having an application storage area for storing an object, a client having a client storage area, an object server for storing an object and a centralized server having information stored therein regarding the client and the location of the object, the computer-readable medium of instructions comprising:

computer-readable code means for storing the object in the application storage area;

computer-readable code means for sending a first request from the client to the centralized server to store the object in the object server;

computer-readable code means for sending, in response to said first request, a second request from the centralized server to the object server to retrieve a copy of the object from the application storage area;

computer-readable code means for retrieving, in response to said second request, said copy of the object directly from the application storage area;

computer-readable code means for storing said copy of the object retrieved by said computer-readable code means for retrieving in the object server; and computer-readable code means for storing in the centralized server information identifying said copy of the object as being stored in the object server.

5. The computer program product recited in claim 4, wherein each of said computer-readable code means operates on a plurality of objects.

6. A computer program product for use in a computer system said computer program product comprising a computer-readable medium of instructions for storing and managing objects in a distributed information storage management system including an application program having an application program storage area for storing a plurality of objects, a client having a client storage area, an object server for storing the plurality of objects and a centralized server having information regarding the client stored therein and the location of the object, the computer-readable medium of instructions comprising:

computer-readable code means for storing the plurality of objects in the application program storage area;

computer-readable code means for sending, for each of the plurality of objects stored, a first request from the client to the centralized server to store the plurality of objects in the object server;

computer-readable code means for sending, in response to each of said first requests sent, a second request from the centralized server to the object server to retrieve a copy of the corresponding object from the application program storage area;

computer-readable code means for retrieving, in response to each of said second requests, the corresponding copy of the object directly from the application program storage area;

computer-readable code means for storing in the object server said copy of the object retrieved; and computer-readable code means for storing in the centralized server information identifying each of said copies of the object as being stored in the object server.

7. An apparatus for storing and managing objects, comprising:

a catalog server;

an object server;

a client;

an application program having a storage area allocated to the application program for storing an object and communicating with said client, wherein in response to a request from said application program said client sends a storage request signal to said catalog server requesting storage of the object in said object server, whereupon in response to said storage request signal said catalog server sends a command signal to said object server to retrieve said object from said storage area of said application program, and in response to said command signal from said catalog server said object server retrieves said object from said storage area and stores the retrieved object in said object server.

8. The apparatus recited in claim 7, wherein said application program requests said storage area to be allocated by said client and in response to said request said client allocates said storage area and provides said storage area to said application program.

9. The apparatus recited in claim 7, wherein said application program allocates and manages said storage area.

10. A computer-readable medium of instructions, comprising:

a catalog server;

an object server;

a client;

an application program having a storage area allocated to the application program for storing an object and communicating with said client, wherein in response to a request from said application program said client sends a storage request signal to said catalog server requesting storage of the object in said object server, whereupon in response to said storage request signal said catalog server sends a command signal to said object server to retrieve said object from said storage area of said application program, and in response to said command signal from said catalog server said object server retrieves said object from said storage area and stores the retrieved object in said object server.

11. The computer-readable medium of instructions recited in claim 10, wherein said application program requests said storage area to be allocated by said client and in response to said request said client allocates said storage area and provides said storage area to said application program.

12. The computer-readable medium of instructions recited in claim 10, wherein said application program allocates and manages said storage area.

\* \* \* \* \*